US006385344B2

(12) United States Patent
Irie et al.

(10) Patent No.: US 6,385,344 B2
(45) Date of Patent: *May 7, 2002

(54) IMAGE PROCESSING APPARATUS

(75) Inventors: Yukio Irie; Shinya Okada; Aya Nakadai; Yoshiyuki Okada, all of Tokyo (JP)

(73) Assignee: Riso Kagaku Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,534

(22) Filed: May 11, 1998

(30) Foreign Application Priority Data

May 12, 1997 (JP) .............................................. 9-121028

(51) Int. Cl.$^7$ ................................................. G06K 9/36
(52) U.S. Cl. ....................................... 382/237; 358/1.9
(58) Field of Search ......................... 395/1.9; 382/237, 382/239, 251–253, 171, 173

(56) References Cited

U.S. PATENT DOCUMENTS

| 5,579,446 | A | * | 11/1996 | Naik et al. .................... 358/1.9 |
| 5,701,366 | A | * | 12/1997 | Ostromoukhov et al. ... 382/237 |
| 5,909,512 | A | * | 6/1999 | Ohshima et al. ............ 382/251 |

FOREIGN PATENT DOCUMENTS

| EP | 637150 | 9/1995 | |
| EP | 0 673 150 | 9/1995 | .......... H04N/1/405 |
| EP | 0 685 961 | 12/1995 | .......... H04N/1/405 |
| EP | 685961 | 12/1995 | |
| JP | 8-51538 | 2/1996 | |

OTHER PUBLICATIONS

J.C. Stoffel et al.: "A Survey of Electronic Techniques for Pictorial Image Reproduction" IEEE Transactions on Communications, vol. Com–29, No. 12, Dec. 1981, pages.

1898–1925, XP000560531 New York (US) *p. 1904, right–hand column, paragraph 3–page 1908, left–hand column, Last line*.

1977 SID International Symposium, Digest of Technical Papers; Society for information Display, Los Angeles (US, 1977 pp. 124–125).

K.W. Wong et al., Adaptive switching of Dispersed and Clustered Halftone Patterns for Bi–Level Rendition: XP000605139.

(List continued on next page.)

Primary Examiner—Thomas D Lee
Assistant Examiner—Stephen Brinich
(74) Attorney, Agent, or Firm—Nixon Peabody LLP; Donald R. Studebaker

(57) ABSTRACT

An operator can select image processing for a half tone image area among a plurality of processing methods, and image processing appropriate for the image can be carried out thereby. An original image is read by an image sensor 1 and output through either simple binary conversion by binary conversion means 3 for character processing or half tone image processing by binary conversion means 2 for photograph processing. Judging means 6 judges whether image data are of a character image area or a half tone image area, and switches output between the binary conversion means 3 for character processing and the binary conversion means 2 for photograph processing. The binary conversion means 2 for photograph processing includes error diffusion processing means 10 and dither processing means 11. By setting of setting means 13 carried out by an operator, output from either the error diffusion processing means 10 or the dither processing means 11 is selected for a half tone image.

2 Claims, 3 Drawing Sheets

OTHER PUBLICATIONS

J.C. Stoffel et al.: "A Survey of Electronic Techniques for Pictorial Image Reproduction", IEEE Transactions on Communications, vol. COM–29, No. 12, Dec. 1981, pp. 1898–1925, XP000560531.

K.Y. Wong et al.: "Adaptive Switching of Dispersed and Clustered Halftone Patterns for Bi–Level Image Rendition", 1977 SID International Symposium, Digest of Technical Papers; Society for Information Display, Los Angeles (US), 1977, pp. 124–125, XP000605139.

* cited by examiner

IMAGE PROCESSING APPARATUS

BACKGROUND OF THE INVENTION

1. Field of the Invention

The present invention relates to an image processing apparatus which carries out predetermined image processing on input image data and outputs them.

2. Description of the Related Art

In an original to be used in a printer, PPC (plane paper copier), or the like, a half tone image having density, such as a photograph, and a character image comprising drawings and characters sometimes coexist.

Image processing which is appropriate for either a half tone image or a character image needs to be carried out thereon respectively. Therefore, in the case of such an original, it is necessary to judge the areas of photographs and characters and to switch to image processing appropriate for each.

In Japanese Unexamined Patent Publn. No. 8(1996)-51538, the present applicant has proposed an image processing apparatus which judges a binary image area and a half tone image area by a grade and converts density by selecting a density conversion curve appropriate for each of the images above.

FIG. 2 is a block diagram showing a configuration of the image processing apparatus disclosed therein.

Image data having been read by an image sensor 50 are input to binary conversion means 51 for character processing and binary conversion means 52 for photograph processing.

The binary conversion means 51 for character processing outputs the result of simple binary conversion on the input image data by using a single threshold value.

A plurality of density conversion curves (A, B, C, and D) shown in FIG. 3 are stored in advance in gamma correction means 55. Prior to binary conversion by the binary conversion means 52 for photograph processing, judging means 56 selects one of the density conversion curves for each target pixel based on the input image data. Some of the density conversion curves are appropriate for processing a character image and some are not. As a result, the binary conversion means 52 for photograph processing appropriately carries out binary conversion on each target pixel in the image data comprising both characters and photographs by use of the appropriately selected density conversion curves.

Among the image data having been binary converted by the both means, image data selected in advance by an operator are output selectively by image processing selecting means 53.

The above apparatus is configured so that binary conversion of a half tone image is carried out by the binary conversion means 52 for photograph processing which uses a predetermined error diffusion method.

As in the above case, when there is only one image processing method for a half tone image area, the choice made by an operator is very limited and it is not guaranteed that desired print is obtained with certainty.

As a method of image processing for a half tone image, 2 kinds of methods, namely the error diffusion method and a dither method, have been generally used.

The dither method excels in tone expression of a half tone image, while it has a problem in reproducing an edge or a character when the edge or the character is located in a half tone image area on an original. Furthermore, since it fundamentally has periodicity, it has a drawback that it tends to create moiré of a mesh dot original.

On the contrary, the error diffusion method is good at reproducing an edge or a character when the edge or the character is located in a half tone image area in an original, and it has a characteristic that it is not prone to created moiré when a mesh dot original is processed by this method. However, in tone expression of a half tone image, graininess becomes worse and a problem in smoothness occurs.

A variety of image processing methods other than the above have been proposed as half tone image processing, and each of them has advantages and disadvantages.

As described above, a configuration wherein an optimal image processing whose advantages are utilized in response to the content of a half tone image in an original is carried out by switching has been desired.

SUMMARY OF THE INVENTION

The present invention has been created in order to solve the problems described above. The object of the present invention is to provide an image processing apparatus which enables an operator to select image processing on a half tone image area among a plurality kinds of image processing, and carries out image processing suitable for the content of an image.

To solve the problems described above, an image processing apparatus of the present invention which comprises judging means which judges the degree of likelihood of being a half tone image pixel or a character image pixel of a target pixel in an original and outputs a judged degree in stepwise values, gamma correction means which has a plurality of density conversion curves showing relations between input density of image data and output density thereof and converts the image data by using the density conversion curve corresponding to the judgment result by the judging means, and binary conversion means for photographic processing which carries out binary conversion on a half tone image by using a predetermined method, is characterized in that it further comprises:

an image processor installed in the binary conversion means for photographic processing, which carries out binary conversion processing on the half tone image by using at least two different kinds of image processing methods and outputs binary-converted image data; and a selector which selects a binary-converted image data output by any one of said at least two kinds of image processing methods.

The binary conversion means for photographic processing may comprise error diffusion processing means which carries out an error diffusion method wherein density difference created when input image data as a target pixel are binary converted by using a threshold value is dealt with as an error and the target pixel is diffused to its surrounding pixels scanned afterwards; and dither processing means which carries out dither processing wherein a half tone image is expressed by changing density of black pixels in a minute area.

An operator sets in advance which half tone image processing is used for binary conversion of image data of an original.

Whether the input image data are likely to be of a character or a half tone image are judged by the judging means on each pixel in the input image data. Based on the judgment result, an optimal density conversion curve is selected among the plurality of density conversion curves, and the density of the target pixel is converted by the density conversion curve having been selected.

The density-converted image data are processed according to the half tone image processing which has been set.

DESCRIPTION OF THE PREFERRED EMBODIMENT

Figure 1:
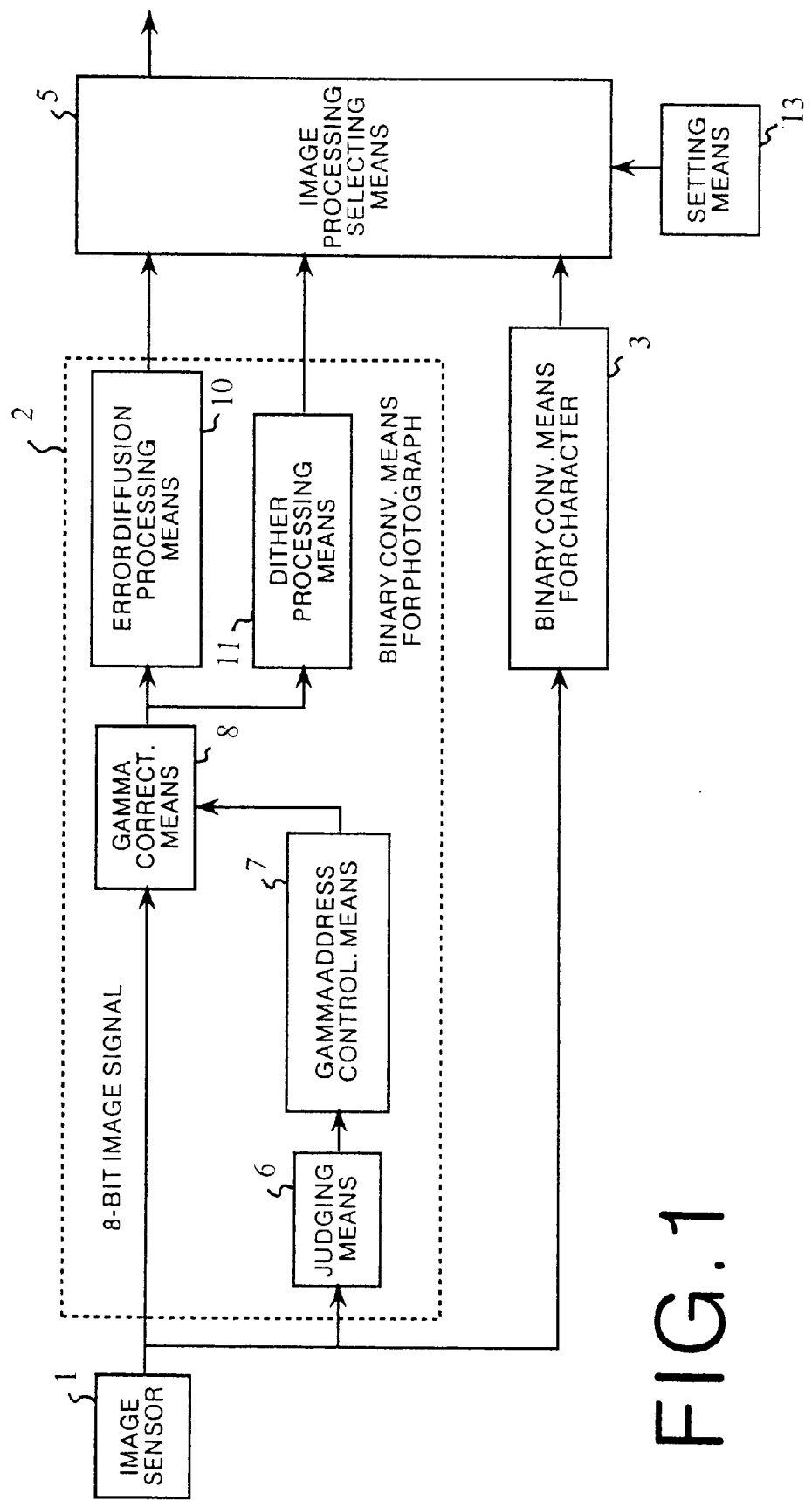
FIG. 1 is a block diagram showing an embodiment of an image processing apparatus of the present invention.
Figure 2:
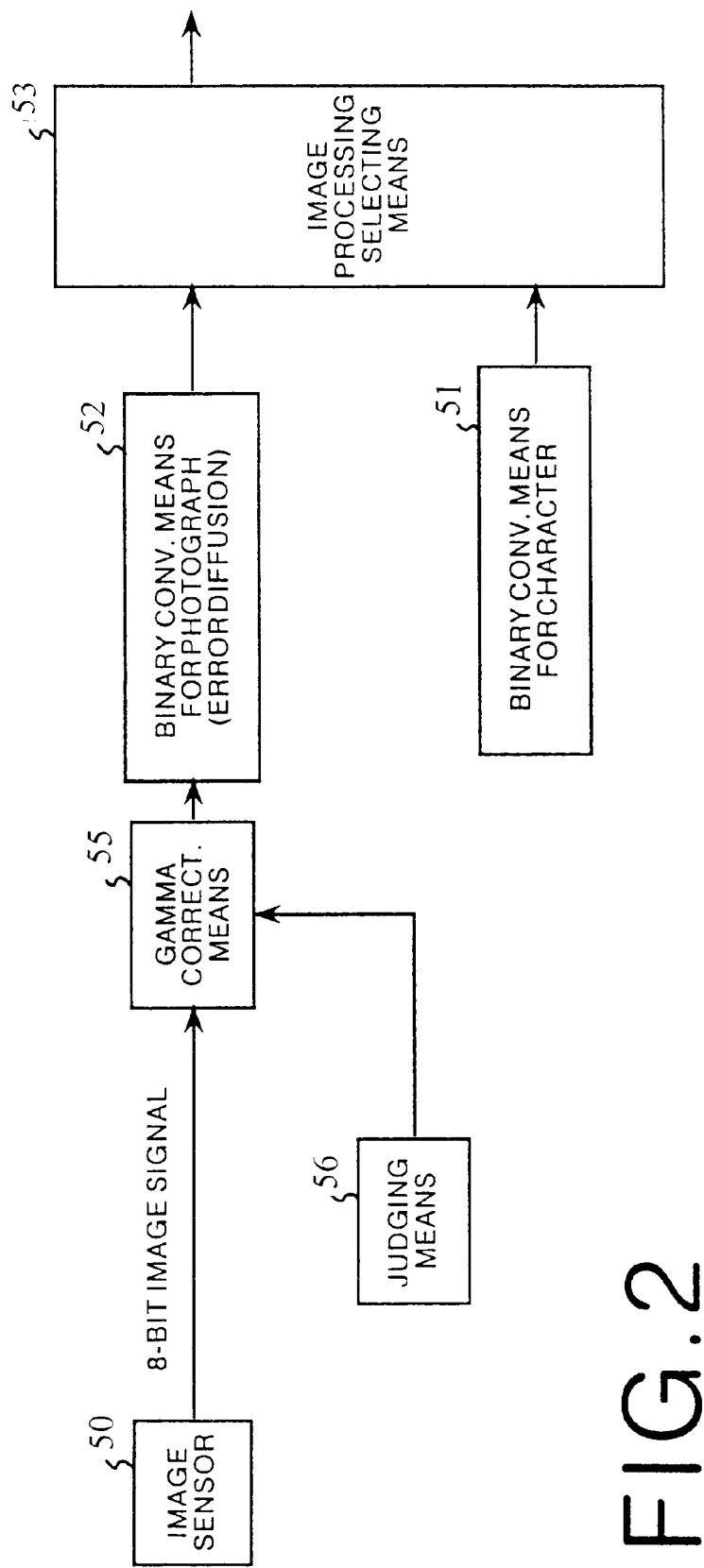
FIG. 2 is a block diagram showing a configuration of a conventional image processing apparatus.

FIG. 1 is a block diagram showing a configuration of an image processing apparatus of the present invention.

An image sensor 1 having a built-in scanner means reads an original and outputs image data thereof.

As the image data (for example, 8-bit), density signals in 256 gray levels wherein white is represented by "0" and black is represented by "255" are output, and the density signals are input to binary conversion means 2 for photograph processing and binary conversion means 3 for character processing.

The image data which have been binary converted by these means are input into image processing selecting means 5. The image processing selecting means 5 selectively outputs image data input through scanning from either binary conversion means 2 or 3 corresponding to a judgment result based on a judgment signal showing whether an image area having been output from a CPU is a half tone image area or a character area.

A threshold value (for example, the mean 128 of the density signals) is set in the binary conversion means 3 for character processing, and image data having been input are simply binary converted to white "0" if the density of the image data does not exceed the threshold value, and to black "1" if exceeds. In this manner, signals output from the binary conversion means 3 for character processing have completely separated areas of black and white, and contour of a character is clear, while half tones are not expressed by this means.

A configuration of the binary conversion means 2 for photograph processing will be explained hereinbelow.

The binary conversion means 2 for photographic processing judges the likelihood of a binary image according to the means described in Japanese Unexamined Patent Publn. No. 8(1996)-51538.

Figure 3:
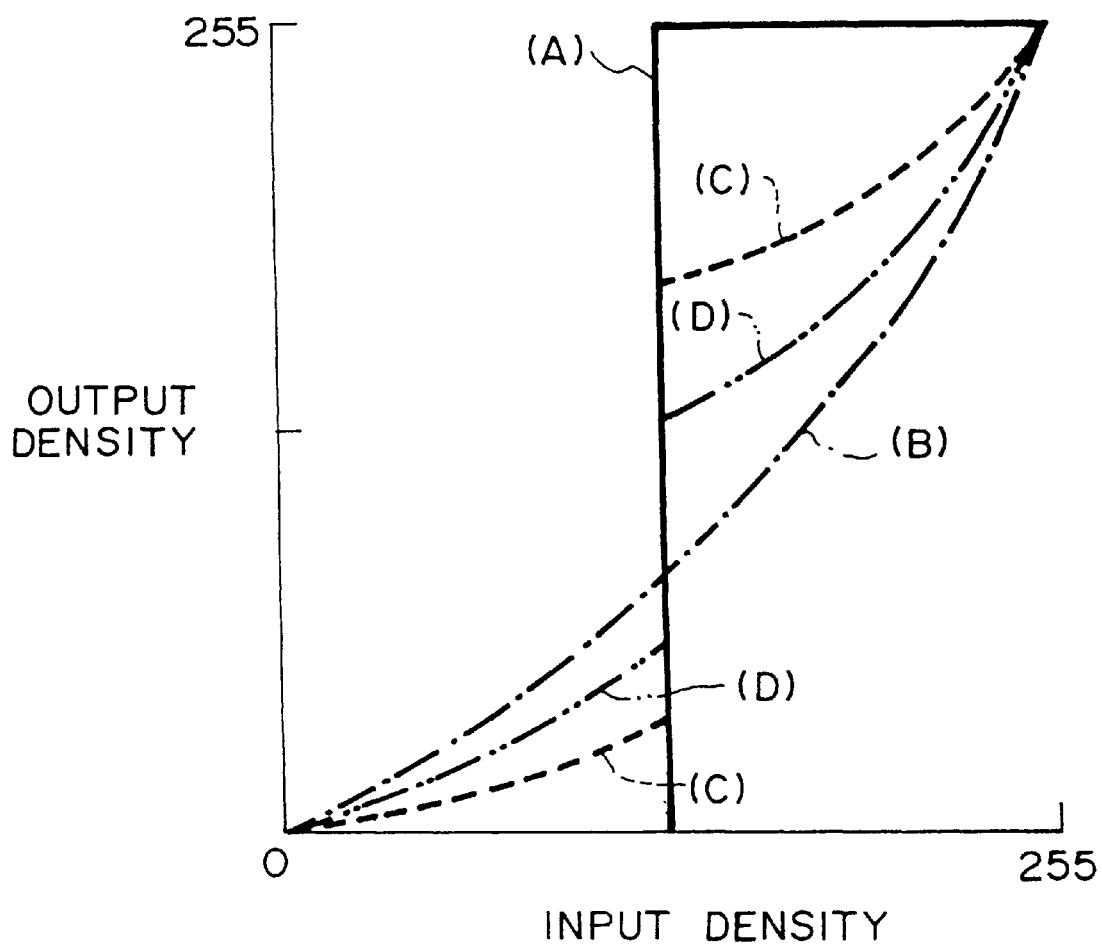
FIG. 3 shows an example of density conversion curves set in judging means of the image processing apparatus of the present invention.

The binary conversion means for photograph processing comprises degree calculating means which calculates the degree of likelihood of being a thin line pixel, that of being an edge pixel, and the degree of edge sharpness or the like by operations using density of neighboring pixels in image data, length calculating means which calculates length of a line segment if the line segment which catches a target pixel between a pixel thereon with density rise and a pixel thereon with density descent along the main or vertical scanning directions exists, distance calculating means which calculates distance between the target pixel and an edge pixel closest to the target pixel, and density conversion means which includes a binary image density conversion curve, a half tone image density conversion curve, and density conversion curves interpolating the two density conversion curves (see FIG. 3) and selects the density conversion curve corresponding to features of the target pixel.

To judge the state of the target pixel, a variety of methods have been used. For example, the state of the target pixel is judged by (1) detecting edge sharpness thereof based on density of neighboring pixels, (2) by judging whether or not the target pixel is an edge pixel based on the density of the neighboring pixels and calculating the distance between the target pixel and the edge pixel closest to the target pixel, and (3) by features of the target pixel which are obtained by whether or not the target pixel is a thin line pixel, whether or not the target pixel is an edge pixel, the degree of edge sharpness of the target pixel, the distance from the target pixel to the edge pixel, and the length of the line segment on which the target pixel lies in the middle.

If there is the line segment which catches the target pixel between a pixel thereon with density rise and a pixel thereon with density descent along the main or vertical scanning direction, the length of the line segment is then calculated. The shorter the line segment is, the more likely the line is a line composing a character. The distance between the target pixel and the edge pixel closest to the target pixel is also calculated. The shorter the distance is, the more likely the target pixel is in a character image, while the longer, the more likely in a half tone image.

Based on the above feature indicative values estimated for each pixel, a binary image density conversion curve A is selected if the feature indicative values show high "likelihood of a binary image". If the feature indicative values show high "likelihood of a half tone image", a half tone image density conversion curve B is selected. If the feature indicative values show the likelihood of neither of the images, an appropriate density conversion curve is selected between density conversion curves C and D which interpolate the two density conversion curves A and B, in response to the degree of the "likelihood of a binary image" or the "likelihood of a half tone image" shown by the feature indicative values.

In this manner, incongruity due to an abrupt change in output image data caused by misjudgment of an image area because of feature indicative values having been calculated in a limited portion of the image, or caused by feature indicative values which do not show high likelihood of a binary image or a half tone image can be reduced.

Furthermore, by selecting the density conversion curve C closer to the binary image density conversion curve A when the target pixel is closer to an edge, and by selecting the density conversion curve D closer to the half tone image density conversion curve B when the target pixel is farther from an edge, a character in thick lines or a flatly blackened portion is made to look darker, and tone characteristics of a half tone image portion in high density can be preserved.

Judging means 6 installed in the input stage of the binary conversion means 2 for photograph processing judges the likelihood of a binary image based on the image data input through the above processing, and the judgment result is input to a CPU and gamma address controlling means 7.

The gamma address controlling means 7 outputs an address signal to show which of the density conversion curves is selected based on the judgment result.

Gamma correction means 8 stores each of the density conversion curves A~D in different addresses in a memory. The gamma correction means 8 carries out gamma correction on input image data by using the density conversion curve corresponding to the address signal having been input, and outputs the gamma-corrected image data.

Binary conversion means for photograph processing which carries out image processing on a half tone image in different methods takes over the processing from the gamma correction means 8. In this embodiment, the binary conversion means for photograph processing includes error diffusion processing means 10 and dither processing means 11.

The error diffusion processing means 10 carries out binary conversion on image data by using the error diffusion method. In the error diffusion method, input image data as a target pixel are binary converted by using a threshold value, and the density difference created upon the conversion between the target pixel density and the threshold value is dealt with as an error. The target pixel is then diffused to surrounding pixels which will be scanned thereafter.

The dither processing means 11 carries out binary conversion on image data by using the dither method. In the dither method, a half tone image is represented by changing the density of black pixels in a minute area. A square area of n×n pixels (a dot matrix) is dealt with as a unit of tone expression, and a threshold value to judge whether each pixel therein is black or white is changed for each pixel. The whole threshold values are represented by an n×n matrix which is called a dither matrix.

The dither processing means 11 in this embodiment carries out binary conversion by using a systematic dither method. The systematic dither method makes a threshold value array according to a rule, and by assigning different threshold values to $n^2$ pixels, $(n^2+1)$ tones can be expressed.

The image processing selecting means 5 selects any one of output from the error diffusion processing means 10, the dither processing means 11, or binary conversion means 3 for character processing, based on setting set by setting means 13.

The setting means 13 is installed in an operation panel or the like of the image processing apparatus, and to enable an operator to set an appropriate binary conversion processing.

As has been described above, the error diffusion processing means 10 and the dither processing means 11 have both the advantages and the disadvantages. Therefore, binary conversion processing with fidelity to an original image can be carried out by choice made by an operator of appropriate binary conversion means corresponding to the original image.

The error diffusion method preserves the density of image data. Therefore, reproduction of a character or an edge portion of an original is fine, and it is not prone to create moiré when a mesh dot original is processed. However, graininess in tone expression of a half tone image becomes poor, and there is a problem in smoothness.

On the other hand, a hardware configuration for the dither processing is simple and does not create a heavy processing load. The dither processing is also good at tone expression of a half tone image. However, the dither processing has a problem in reproducing characters or an edge portion of an original. Furthermore, since it basically has periodicity, moiré tends to occur in a mesh dot original.

Therefore, an operator selects the appropriate processing between the error diffusion processing and the dither processing by looking at a half tone image in an original when the operator places the original on the image processing apparatus to read image data thereof. For example, to prevent moiré of a half tone image from occurring, the error diffusion processing is selected, while the dither processing is selected to put weight on tone expression of the half tone image.

In the above embodiment, the image processing apparatus is configured so that either the error diffusion processing or the dither processing is selected. However, it may be configured so that other kinds of processing is selected.

Other methods for binary conversion of a half tone image is listed below. To classify roughly, there are dither methods, density pattern methods, and pixel distribution methods.

The dither methods include a) conditional decision methods and b) individual decision methods. The conditional decision methods include a mean error minimizing method, the error diffusion method having been described above, a mean value limiting method, and a dynamic threshold value method. The individual decision methods include a random dither method and the systematic dither method (which has been described above).

The density pattern methods include a random pattern method and a systematic pattern method.

The pixel distribution methods include a mesh pixel distribution method and a multi-step division quantization method.

By installing the binary conversion means 2 for photograph processing including a variety of binary conversion methods such as the above and using the configuration wherein the binary conversion methods can be selected by the setting means 13, choice of image processing on a half tone image area is extended, and image processing appropriate for reproducing an original image can be selected.

According to the present invention, since the binary conversion means for photograph processing includes the processing means which outputs binary-converted data of a half tone image by using different methods and the image processing apparatus is configured so that the binary conversion output by using any one of the processing means is selected by the setting means, a half tone image area in image data are binary converted by the processing means which has been selected upon image data input. As has been described above, since an operator can select image processing for a half tone image area in an original, image processing appropriate for the content of the image area can be carried out, and an output image desired by the operator can be obtained.

Furthermore, since the image processing apparatus of the present invention is configured so that the image processing based on either the error diffusion method or the dither method can be selected, the advantages of the error diffusion method, such as prevention of moiré of a half tone image, can be utilized if the error diffusion method is selected, while the advantages of the dither method, such as excellent tone expression, can be utilized if the dither method is selected.

In other words, the image processing apparatus of the present invention is configured so that image processing according to output desired by an operator can be carried out thereby, functions and convenience of the image processing apparatus can be improved.

What is claimed is:

1. An image processing apparatus comprising:
   a means for judging a degree of likelihood of being a half tone image pixel or a character image pixel of a target pixel in an original and for outputting a judge degree in stepwise values;
   a gamma correction means having a plurality of density conversion curves showing relations between input density of image data and output density thereof for converting the image data by using one of the density conversion curves corresponding to the judgment result by the judging means;

binary conversion means for photographic processing for carrying out binary conversion on a half tone image by using a predetermined method;

said binary conversion means further comprises an image processor means for carrying out binary conversion processing on the half tone image by using one of at least two different kinds of image processing methods and outputting binary-converted image data; and a selector means selected by a user for selecting a binary-converted image data output by any one of said at least two kinds of image processing methods.

2. The image processing apparatus as claimed in claim 1, wherein said at least two different kinds of image processing method for photographic processing comprises an error diffusion means and a dithering processing means.

\* \* \* \* \*